United States Patent
Moothoor et al.

(10) Patent No.: US 10,440,137 B2
(45) Date of Patent: Oct. 8, 2019

(54) EFFICIENT USAGE OF RESOURCES IN MULTIPLE MIDDLEWARE ENVIRONMENTS

(71) Applicant: International Business Machines Corporation, Armonk, NY (US)

(72) Inventors: Jithesh Moothoor, Bangalore (IN); Gopalakrishnan P, Bangalore (IN); Hariharan N. Venkitachalam, Bengaluru (IN)

(*) Notice: Subject to any disclaimer, the term of this patent is extended or adjusted under 35 U.S.C. 154(b) by 371 days.

(21) Appl. No.: 15/093,781

(22) Filed: Apr. 8, 2016

(65) Prior Publication Data
US 2017/0295254 A1 Oct. 12, 2017

(51) Int. Cl.
G06F 15/16 (2006.01)
H04L 29/08 (2006.01)
H04L 29/06 (2006.01)

(52) U.S. Cl.
CPC .......... H04L 67/2833 (2013.01); H04L 67/42 (2013.01)

(58) Field of Classification Search
CPC .......................... H04L 67/2833; H04L 67/42
See application file for complete search history.

(56) References Cited

U.S. PATENT DOCUMENTS

| | | | |
|---|---|---|---|
| 2010/0064298 A1* | 3/2010 | Schneider | G06F 9/485 719/317 |
| 2012/0158824 A1* | 6/2012 | Park | G06F 9/5083 709/203 |
| 2013/0326045 A1* | 12/2013 | Wang | H04L 63/20 709/223 |
| 2014/0033205 A1 | 1/2014 | Kashyap et al. | |
| 2015/0256599 A1 | 9/2015 | Kaushik et al. | |
| 2016/0062769 A1* | 3/2016 | Park | G06F 9/30181 712/235 |
| 2016/0203180 A1* | 7/2016 | Hanai | G06F 12/00 707/758 |
| 2016/0275150 A1* | 9/2016 | Bournonnais | G06F 17/30536 |

OTHER PUBLICATIONS

Micro Focus, "Interoperability," Micro Focus Documentation, Last printed on Dec. 14, 2015, 1 page http://documentation.microfocus.com/help/index.jsp?topic=%2Fcom.microfocus.eclipse.infocenter.visualcobol.eclipseux%2FH2IOIOIOPY00.html.
Mrvenkatkrish, "RES—An Open Cobol to Java Translator," Sourceforge, Last Update: Apr. 29, 2013, Last printed on Dec. 14, 2015, 5 pages.
Unknown, "Migrating from a transaction processing platform to Java EE," Project plan—port Cobol and C applications to Java EE, Bull Architect of an Open World, Last printed on Dec. 14, 2015, 4 pages http://libertp.bull.com/project-plan-porting-cobol-c-to-java-ee/.

* cited by examiner

*Primary Examiner* — Aftab N. Khan
*Assistant Examiner* — Anh Nguyen
(74) *Attorney, Agent, or Firm* — Nolan M. Lawrence

(57) ABSTRACT

A first request to a first thread-based server from a first thread-based client is detected. The first request is derived by the first thread-based client in response to a first call from a first user program running on process-based middleware. The first request is intercepted from a communication pathway. The first request is converted to a merged request. The merged request is intended for a merged thread-based server of the thread-based middleware. The merged request is sent to the merged thread-based server.

20 Claims, 4 Drawing Sheets

EFFICIENT USAGE OF RESOURCES IN MULTIPLE MIDDLEWARE ENVIRONMENTS

BACKGROUND

The present disclosure relates to middleware, and more specifically, to efficient usage of resources between multiple middleware software environments.

Middleware may be utilized to permit the creation of software programs without a need to create an entire software environment. Middleware may be utilized in commercial business scenarios, allowing business users to develop software for forecasting potential products and associated marketing. Middleware may be utilized in educational scenarios, allowing non-programming students and teachers to develop programs with low startup time and costs. Middleware may allow for enhanced software programs within a software development team as software engineers may focus on the higher-level logic.

SUMMARY

Disclosed herein are embodiments of a method, computer program product, and system for operating hybrid middleware. The hybrid middleware may include a thread-based middleware and a process-based middleware. A thread transformer detects a first request to a first thread-based server from a first thread-based client. The first request is derived by the first thread-based client in response to a first call from a first user program running on the process-based middleware. The thread transformer intercepts the first request from a communication pathway. The thread transformer converts the first request to a merged request. The merged request is intended for a merged thread-based server of the thread-based middleware. The thread transformer sends the merged request to the merged thread-based server.

In some embodiments, the thread transformer detects a second request to a second thread-based server from a second thread-based client. The second request is derived by the second thread-based client in response to a second call from a second user program running on the process-based middleware. The thread transformer intercepts the second request from a second communication pathway. The second communication pathway facilitates multiprocessing by the process-based middleware. The thread transformer converts the second request to a second merged request. The second merged request is intended for the merged thread-based server of the thread-based middleware. The thread transformer sends the second merged request to the merged thread-based server.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
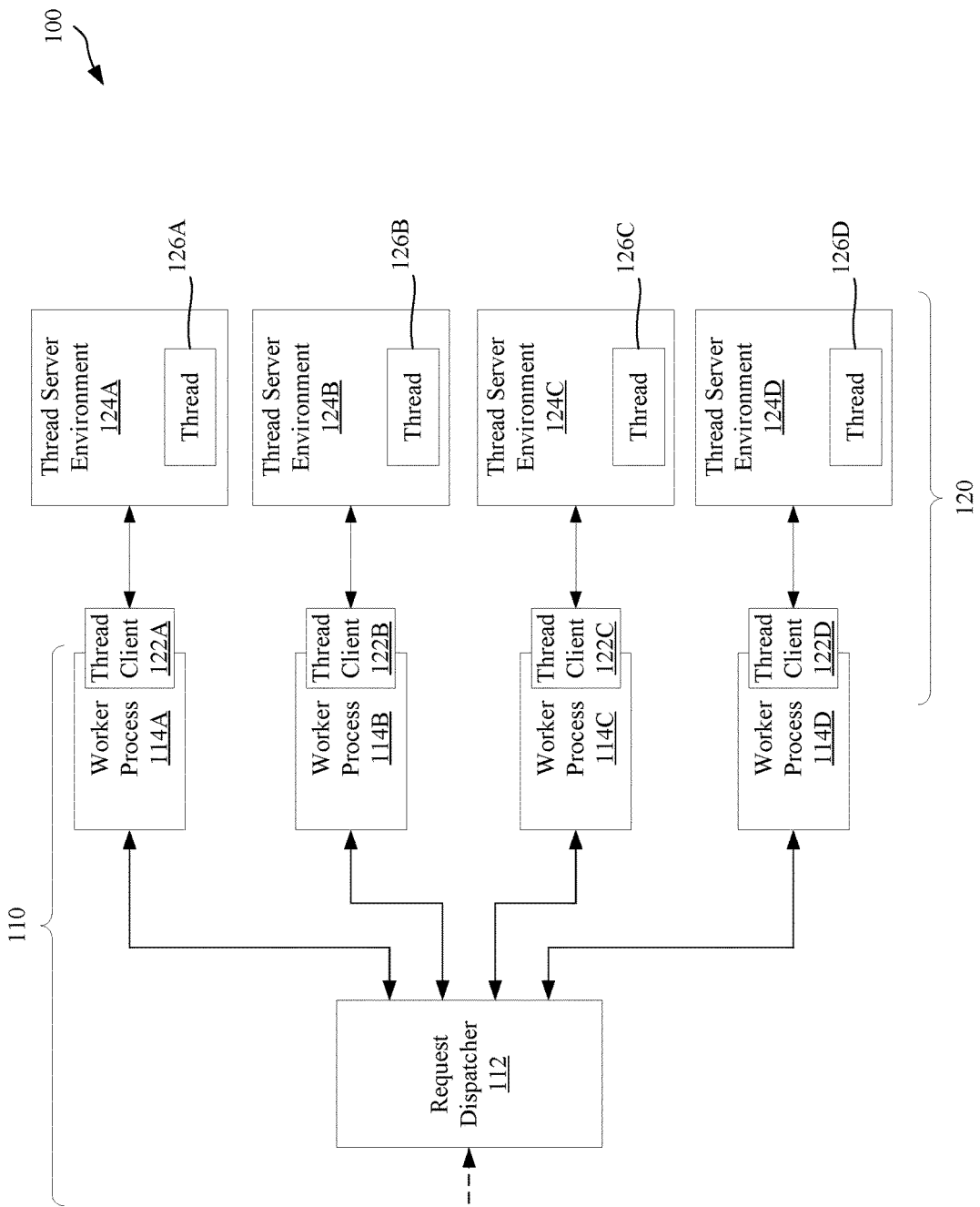
FIG. 1 depicts a computing environment that provides hybrid middleware capabilities to end users.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to middleware, more particular aspects relate to efficient usage of resources between multiple middleware software environments. While the present disclosure is not necessarily limited to such applications, various aspects of the disclosure may be appreciated through a discussion of various examples using this context.

Middleware may provide enhanced capabilities to the development, deployment, and execution of software programs. Middleware may provide access to facilities such as hardware and the operating system without writing extended amounts of software code. The facilities may include one or more software programs and application programming interface (API) standards. Middleware may be utilized for a variety of use cases (e.g., web servers, application servers, content managements systems, etc.). Middleware may provide abstraction from specific hardware and low level software (e.g., operating systems, drivers, etc.)—abstraction yields enhanced flexibility and stability. Middleware may also provide additional benefits such as concurrency, transaction based operation, parallelism, messaging, and security. An end user program (program) may include one or more lines of software code that may be organized into one or more subdivisions (e.g., files, classes, functions, etc.) and may be written in one or more programming languages (e.g., C, C++, COBOL, Java, etc.).

With the proliferation of software usage, two variations of middleware have developed: process-based middleware and thread-based middleware. Process-based middleware may operate by each end-user program spawning and executing as a separate process. Examples of process-based middleware may include IBM TXSeries®, Oracle Tuxedo®, and the like. Process-based middleware may provide superior security and stability as each process operates within a separate memory space. Thread-based middleware may operate by each end-user program spawning and executing as a separate thread within one or more processes. Examples of thread-based middleware may include WebSphere®, JBOSS®, and the like. Thread-based middleware may provide superior efficiency and resource usage as each thread may operate within a shared memory space.

In many situations end users and middleware providers may dictate which usage of middleware (or other server environment) is appropriate for a given situation. End users may write programs for process-based middleware or thread-based middleware due to the end users' familiarity with a certain programming language. End users may write programs based on their familiarity with the middleware product. End users may write programs based on the type of problems they are trying to solve (e.g., string manipulation, number manipulation, pre-defined language-specific functions, etc.). Middleware providers may choose middleware based on their familiarity and mastery with administering the middleware. Middleware providers may choose middleware based on licensing costs and other non-technical restrictions. In some situations both process-based middleware and thread-based middleware may be utilized in a single end user program. Sometimes end users and middleware providers may utilize some other server environment (e.g., a Java SE® server) together with one or more types of middleware.

Figure 4:
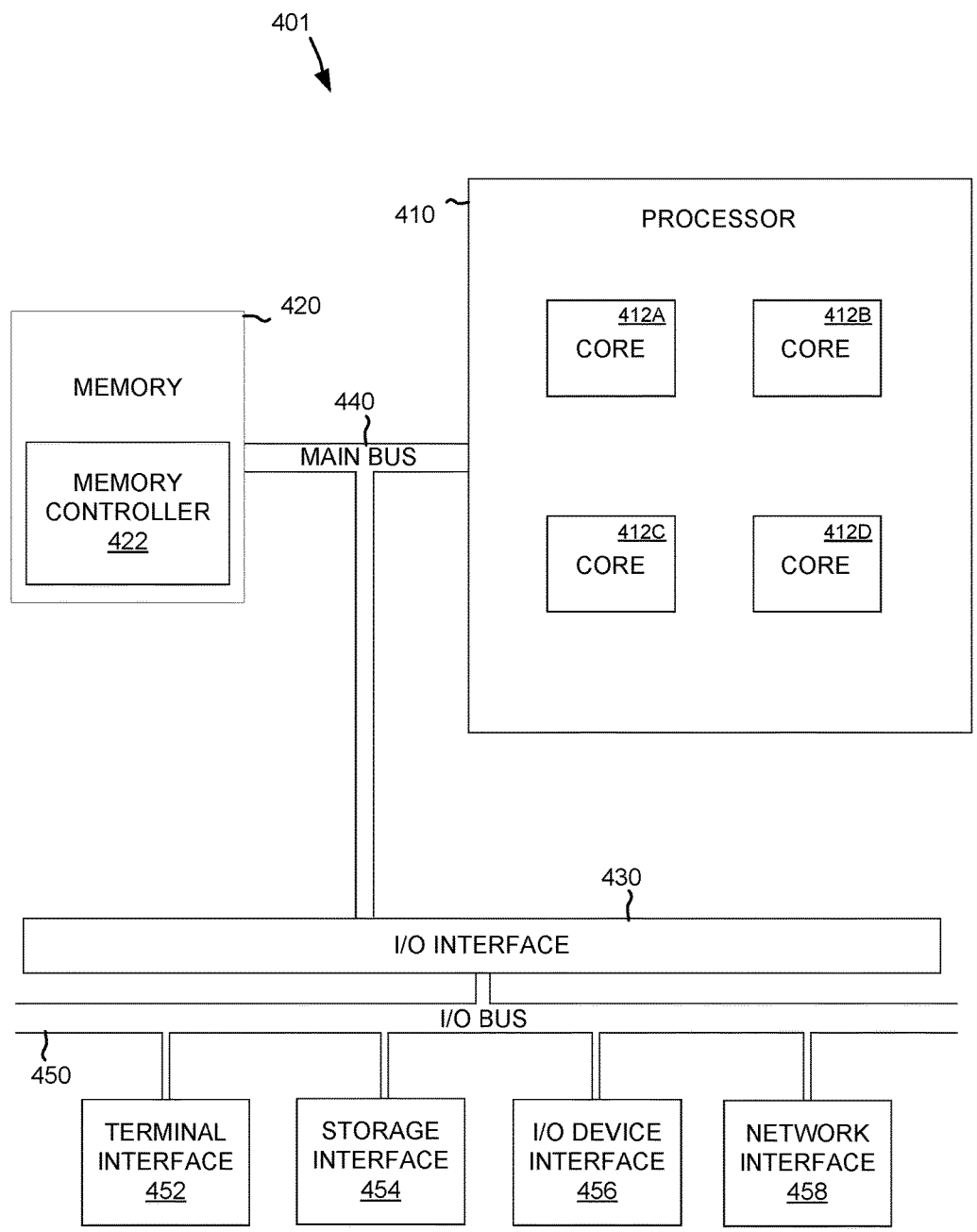
FIG. 4 depicts the representative major components of an exemplary computer system that may be used in accordance with embodiments of the present disclosure.

FIG. 1 depicts a computing environment 100 that provides hybrid middleware capabilities to end users. The computing environment 100 may also include one or more nodes (not depicted) for hosting middleware. Each node may be a computer system that provides hardware resources (e.g., memory, processing, and input-output). An example computer system capable of hosting middleware is depicted in FIG. 4. The hybrid middleware may enable end users and middleware providers access to both process-based middleware requests and thread-based middleware requests. Hybrid middleware may be attractive because it allows users to create programs with low deployment costs and with high compatibility to various languages as dictated by a particular circumstance (e.g., where legacy systems need to interface with newer systems). The hybrid middleware may include a process-based middleware 110 and a thread-based middleware 120.

The process-based middleware 110 may include the following: a request dispatcher 112; and one or more worker processes 114A, 114B, 114C, and 144D (collectively 114). The process-based middleware 110 may also include additional components or software modules not depicted (e.g., additional worker processes). The process-based middleware 110 may operate on a host operating system (not depicted) also being executed by the nodes. The request dispatcher 112 may be an operating system process that receives requests from end users (e.g., a web rendering request, a document generation request, etc.). The request dispatcher 112 may, based on the request, instruct one of the worker processes 114 to execute the end user program. Each worker process 114 may be additional operating system processes capable of executing programs written in a programming language. For example, if an end user requests execution of a program that is written in Common Business-Oriented Language (COBOL), the request dispatcher 112 may instruct worker process 114B to execute the COBOL program code received from the end user.

The thread-based middleware 120 may include the following: one or more thread clients 122A, 122B, 122C, and 122D (collectively 122); one or more thread server environments 124A, 124B, 124C, and 124D (collectively 124); and one or more threads 126A, 126B, 126C, and 126D (collectively 126). Each of the thread clients 122 may be a module invoked by the worker processes 114 (e.g., libraries, accessed through APIs, that provide requests to the thread server environments 124). For each worker process 114 there may be a corresponding thread client 122 (e.g., worker process 114C utilizes thread client 122C). The thread server environments 124 may be a software container providing necessary processing and handling of requests from the thread clients 122.

Each thread server environment 124 may execute as an operating system process on a node in the computing environment 100. Each thread server environment 124 may include at least one thread 126 (e.g., thread server environment 124D may include thread 126D). Each thread server environment 124 may also include other threads (not depicted). Each thread 126 may execute the end user program. The thread server environments 124 may be spawned as each corresponding worker process 114 of the process-based middleware 110 requires. For example, if a new worker process (not depicted) is created by the request dispatcher 112, an additional thread server environment (not depicted) will also need to be created.

In some situations, each thread server environment 124 is only capable of executing end user programs for corresponding worker processes 114 (e.g., worker process 114A utilizes only thread server environment 124A, worker process 114B utilizes only thread server environment 124B, etc.). For example, a first end user requests execution of a program that is written partly in COBOL and partly in Java. The COBOL program may be executable by a process-based middleware and the Java program may be executable by a thread-based middleware. The request dispatcher 112 receives the program and the program request from the end user and, in response, instructs worker process 114C to execute the program. The request dispatcher 112 utilizes a communication pathway (e.g., inter-process communication, a communication buffer created by the process-based middleware, etc.).

Worker process 114C begins execution of the COBOL program code, performing the program operations based on the code provided by the request dispatcher 112 from the end user. When the COBOL program code makes a call to Java program code, the worker process 114C utilizes thread client 122C to make a request to thread server environment 124C. The request also utilizes the communication pathway utilized by the request dispatcher 112. Thread server environment 124C dispatches execution of the Java program code to thread 126C. After execution of the Java program code by thread 126C, thread server environment 124C provides any return to thread client 122C through the communication pathway.

Continuing the example and contemporaneously to the first end user, a second end user requests execution of a second program that is written partly in C++ and partly in Java. The request dispatcher 112 receives the second program and the second program request and, in response, instructs worker process 114D to execute the second program. Worker process 114D begins execution of the C++ program code, performing the second program operations based on the code provided by the request dispatcher 112 from the second end user. When the C++ code of the second program makes a call to the Java code of the second program, the worker process 114D utilizes thread client 122D to make a request to thread server environment 124D. Thread server environment 124D dispatches execution of the Java code of the second program to thread 126D. After execution by thread 126D, thread server environment 124D provides any return or response to thread client 122D through the communication pathway.

An optimized hybrid middleware (OHM) may provide all of the advantages of hybrid middleware with additional benefits. The OHM may include process-based middleware, thread-based middleware, and a thread transformer. Alternatively, the OHM may include one middleware (e.g., process-based middleware), a language environment (e.g., a Java SE® thread server environment), and a thread transformer. The OHM may reduce the redundancy of thread-based servers spawned for each process of the process-based server. The OHM may instead employ the usage of a single thread-based server that is able to handle requests from multiple processes. The OHM may operate by detecting requests from thread-based clients to thread-based servers. The thread-based client requests may be derived by the thread-based clients from requests from a process running an end-user application. After detecting the, the OHM may intercept and send the thread-based client requests to a single or merged thread-based server. Thus, the singular thread-based servers may no longer be need for each process-based middleware program—reducing redundancy.

The OHM may allow for reduced redundancy that may provide more efficient usage of hardware resources (e.g., each instance of a thread-based server and its associated environment requires memory, processing, and input/output to operate). The OHM may also reduce the latency in processing requests to the thread-based middleware (or thread-based language environment). Because a single thread-based server can handle all thread requests, a middleware provider may not need to start and stop the thread-based server eliminating startup times. The OHM may provide for a variety of thread-based architectures (e.g., Java SE®, Java EE®, .NET Framework®, etc.). The OHM may utilize unmodified thread-based middleware such that any client-server interaction of the thread-based middleware need not be customized.

Figure 2:
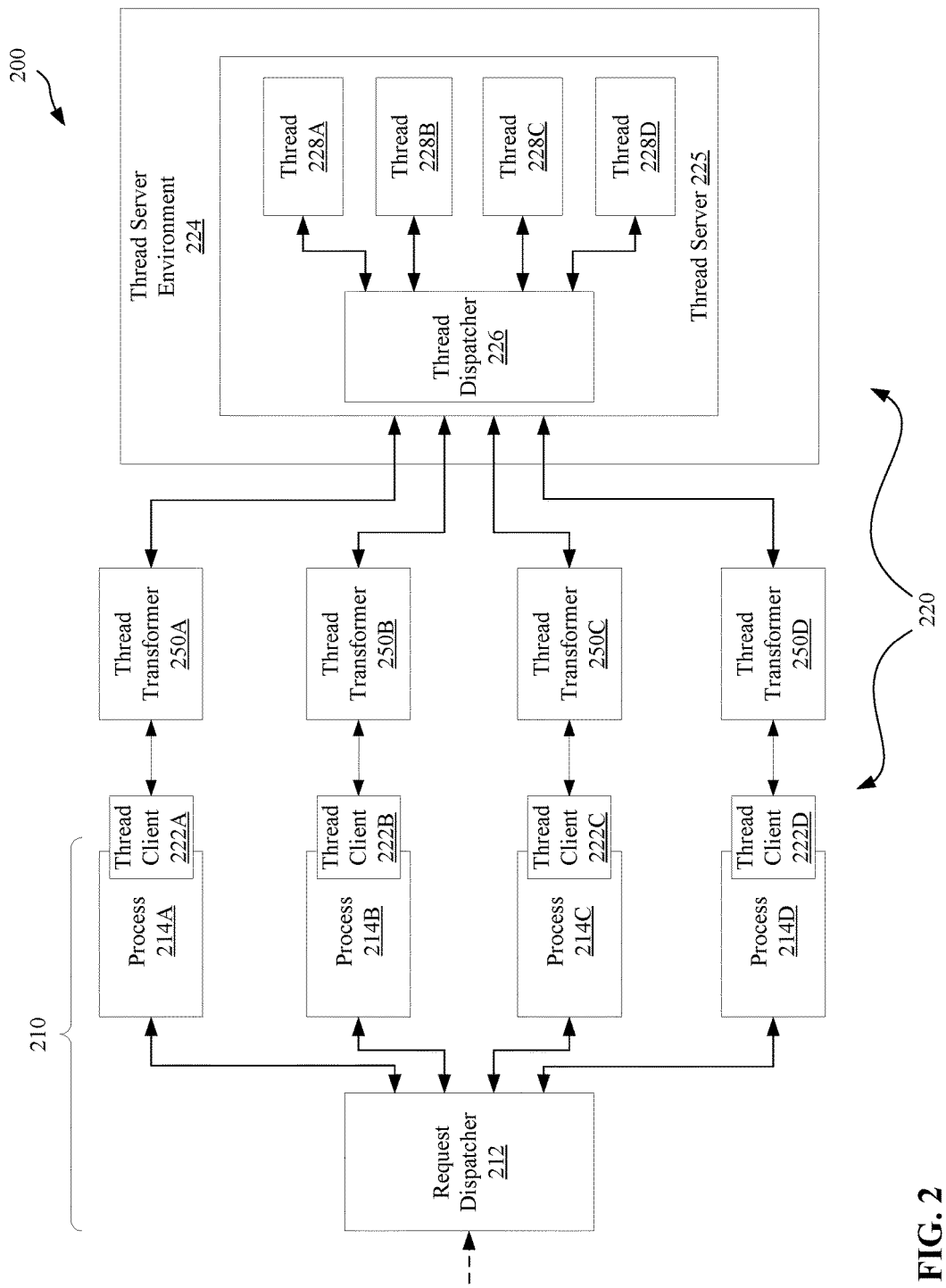
FIG. 2 depicts an optimized hybrid middleware computing environment utilizing a thread transformer in accordance with embodiments of the present disclosure.

FIG. 2 depicts an optimized hybrid middleware computing environment 200 utilizing a thread transformer in accordance with embodiments of the present disclosure. The computing environment 200 may also include one or more nodes (not depicted) for hosting the OHM. Each node may be a computer system that provides hardware resources (e.g., memory, processing, and input-output) and may also include an operating system. An example computer system capable of hosting middleware is depicted in FIG. 4. The OHM may allow middleware providers to host end user programs with improved scalability. The OHM may include a process-based middleware 210, a thread-based middleware 220 (alternatively, thread-based language environment), and one or more thread transformers 250A, 250B, 250C, and 250D (collectively 250). The process-based middleware 210 and the thread-based middleware 220 may be launched by an administrative user and thereafter continuously wait for and perform requests from end users.

The process-based middleware 210 may include a request dispatcher 212 and one or more worker processes 214A, 214B, 214C, and 214D (collectively). The process-based middleware 210 may also include additional components or software modules not depicted (e.g., additional worker processes, administrative daemons, etc.). The process-based middleware 210 may operate in conjunction with a host operating system (not depicted) also being executed by the nodes. The request dispatcher 212 may be an operating system process that receives requests from end users (e.g., a web rendering request, a document generation request, a mathematical calculation request, and end-user content creation program, etc.).

The request dispatcher 212 may, based on the request, instruct one of the worker processes 214 to execute the end user program. In some embodiments, the request dispatcher 212 also performs administrative operations related to the process-based middleware 210. For example the request dispatcher 212 may create and/or terminate additional worker processes (not depicted) as well as create or terminate worker processes 214. The request dispatcher 212 may coordinate with the host operating systems to create and/or terminate the worker processes 214. Each worker process 214 may be an operating system processes capable of executing programs written in a programming language. For example, an end user requests execution of a program that is written in COBOL. The request dispatcher 212 instructs worker process 214B to execute the COBOL program code received from the end user.

The thread-based middleware 220 of the OHM may include the following: one or more thread clients 222A, 222B, 222C, and 222D (collectively 222); a thread server environment 224; a thread server 225 executing within the thread server environment; a thread dispatcher 226; and one or more threads 228A, 228B, 228C, 228D (collectively 228). Each of the thread clients 222 may be modules (e.g., libraries, accessed through APIs, which provide requests to the thread server environment 224) called upon or invoked by the worker processes 214. In some embodiments, the thread clients 222 may be additional processes that work in conjunction with the worker processes 214 (e.g., operating system processes forked from one of the processes of the process-based middleware 210). In some embodiments, the thread clients 222 may be in the form of a container or package along with libraries and modules necessary for operation. For each worker process 214 there may be a corresponding thread client 222 (e.g., worker process 214A utilizes thread client 222A, worker process 214B utilizes thread client 222B, etc.).

The thread clients 222 may be unaware of the presence of thread server environment 224 and may generate requests for thread server environments (not depicted) other than thread server environment 224. For example, thread client 222B may generate a request that is destined for a first thread server and thread client 222B may generate a request that is destined for a second thread server. The first thread server and the second thread server may not actuality exist. The thread clients 222 may generate the requests utilizing a communication pathway such as an inter-process communication (e.g., semaphores, pipes, message queues, etc.). In some embodiments, the thread clients 222 may generate the requests utilizing a communication pathway such as a network (e.g., network ports, sockets, packets, etc.).

The thread server environment 224 may handle requests from the thread clients 222. The thread server 224 may be a collection of software code, classes, APIs and other related files (e.g., servlets, containers, runtime environments, etc.). The thread server environment 224 may be utilized as the basis for thread server 225. The thread server environment 224 may also be utilized for a secondary thread server (not depicted) to provide fault tolerance if thread server 225 becomes unavailable. In some embodiments, another thread server environment (not depicted) may be the basis for a secondary thread server. The thread server 225 (merged thread server) may handle requests (merged requests) from the plurality of thread clients 222. The thread server 225 may include a thread dispatcher 226 and a plurality of threads 228A, 228B, 228C, and 228D (collectively 228). The threads 228 may perform execution of end user programs as they are passed to the thread server environment 224. The thread server environment 224, the thread server 225, or both may be unaware of the presence of the thread clients 222 and may respond to requests from a thread client (not depicted) other than thread clients 222. For example, thread server 225 may generate a response that is directed to a presumed thread client that does not exist.

The thread transformers 250 of the OHM may communicatively couple the thread clients 222 and the thread server environment 224. The thread transformers 250 may be a plurality of modules embedded into each of the thread clients 222, the thread server environment 224 or both. By being a plurality of modules, the thread transformer 250 may be utilized without any modifications to the process-based middleware 210 and the thread-based middleware 220. The thread transformers 250 may be in the form of libraries, packages, containers, components, or other conventions utilizes by thread-based environments (e.g., a Java servlet, request handlers, etc.). The thread transformers 250 may be utilizes with a non-commercial thread-based middleware such as Java SE®. By providing compatibility with a non-enterprise thread-based middleware, the thread transformer 250 may be ideal for simple functionality (e.g., a random number generation function). By providing non-enterprise middleware compatibility the thread transformer 250 may provide increased response time over the usage of enterprise middleware (e.g., because enterprise middleware may require the loading of additional services and the customization of various components). By providing non-enterprise middleware compatibility the thread transformer 250 may be utilized in additional computing environments (e.g., where licensing restricts the field of usage of the middleware, where license fees are prohibitive, etc.).

The thread transformers 250 may redirect the requests and responses, respectively, of the thread clients 222 and the thread server environment 224. In detail, each thread transformer 250 may detect requests from the respective thread clients 222 (e.g., thread transformer 250A may listen for requests from thread client 222A, thread transformer 250B may listen for request from thread client 222B, etc.). Upon creation of a request by one of the thread clients 222 the respective thread transformer 250 may intercept the requests from the communication pathways (e.g., thread transformer 250C may intercept an inter-process communication socket created by thread client 222C). Upon interception of a request, a given thread transformer 250 may convert the request to a merged request to direct to the thread server environment 224 (e.g., modifying the datagram of a Unix domain socket, modifying the message of a message queue, etc.). In some embodiments, the thread transformer 250 may send the modified request to the thread server environment 224. For example, taking a message that is in one queue and placing it in a queue assigned to the thread server environment 224. Also upon creation of a merged response by the thread server environment 224, the thread transformers 250 may convert the merged responses into individual responses for the thread clients 222.

Figure 3:
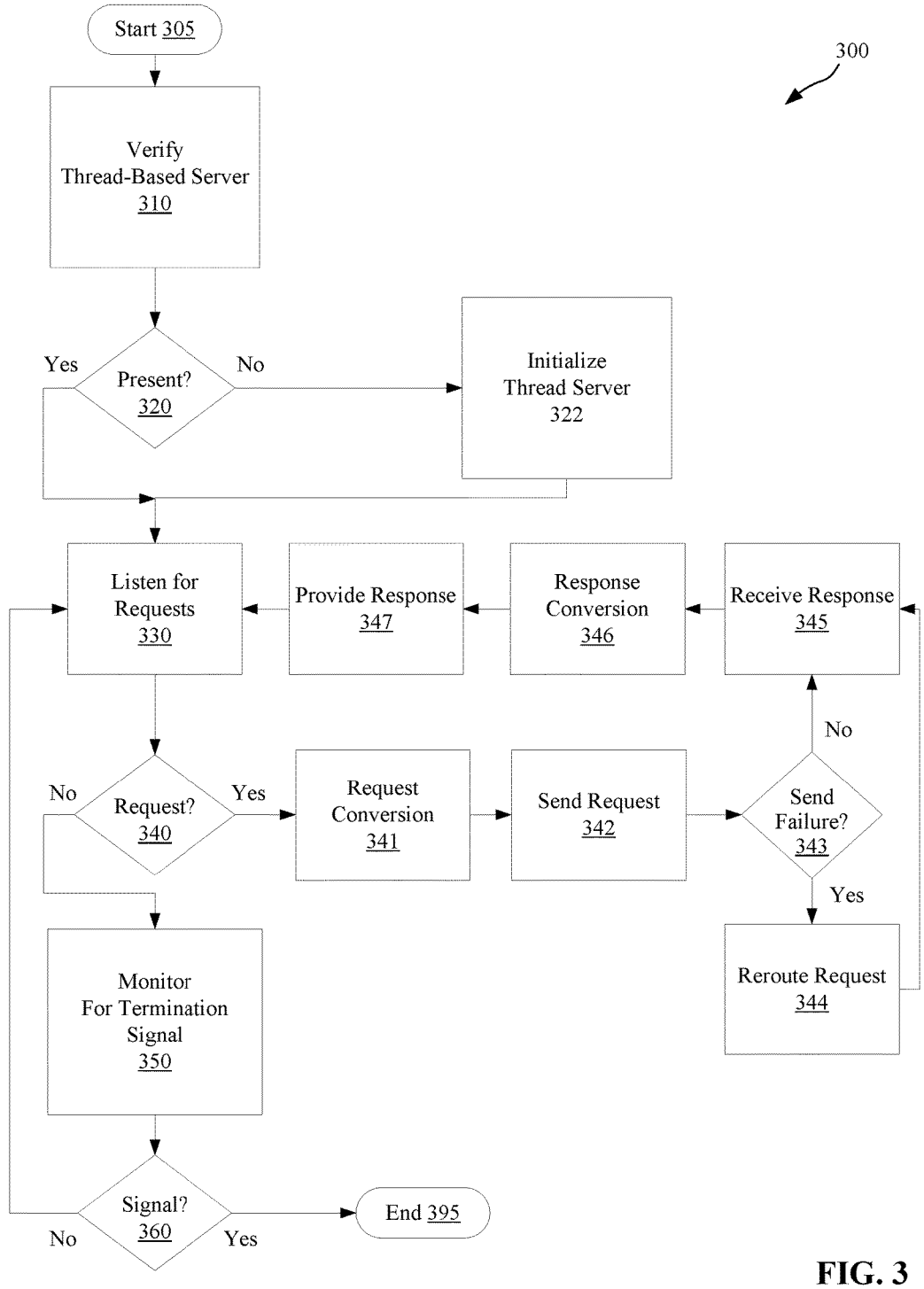
FIG. 3 depicts an example method of a thread transformer connecting a process-based middleware to a thread based-middleware in accordance with embodiments of the present disclosure.

FIG. 3 depicts an example method 300 of a thread transformer connecting a process-based middleware to a thread based-middleware in accordance with embodiments of the present disclosure. Method 300 may be executed by one or more processes responsible for executing end user applications of the process-based middleware and by a process responsible for executing the thread-based middleware. In some embodiments, method 300 may be executed by a thread transformer process separate from the process-based middleware and the thread-based middleware. In some embodiments, method 300 may also be executed by an operating system. Method 300 may include more or less steps than those depicted. Method 300 may be executed many times rapidly (e.g., every sixteen milliseconds, every ten milliseconds).

From start 305, the thread transformer may verify if the thread-based middleware is presently running a server at 310. The verification may be in the form of querying for a list of active thread servers. The verification may be in the form of sending requests to an operating system for the presence of thread servers. If a thread server is not present, at 320, the thread transformer may initialize a thread server at 322. The initialization may be a call to the operating system for an instance of the thread server. The initialization may be prompting an administrator of the thread-based middleware to begin execution of the thread server. In some embodiments, the thread transformer may have the ability to directly initialize the thread server (e.g., by forking a thread server process).

If the thread server is present, at 320, the thread transformer may begin listening for requests at 330. The thread server may listen for requests, at 330, from a worker process of the process-based middleware to execute an end user program. The thread server may be assigned a specific worker process to listen to at or before startup. The requests may be from one or more thread-based clients to execute an end user program. The worker process or thread-based client may make the requests through a communication pathway. The requests may be calls through API from an end user program currently being executed by a worker process of the process-based middleware. The requests may be in the form of a message being placed in a message queue that is directed to a thread server. The request may be directed to another entity besides the thread server (e.g., the request may be for another thread server).

If there is a request, at 340, the thread transformer may convert the request at 341. The request may be converted, at 341, between the process-based and thread-based languages of the various servers running on the middleware. The request conversion, at 341, may be based on various data conversion mappings and may be dependent upon the specific languages running throughout the middleware. For example, if a COBOL process calls a Java thread, the request may be converted, at 341, by transforming the data from a COBOL buffer into a Java object.

The thread transformer may send the request to a thread server at 342. The request may be sent, at 342, by modifying the request (e.g., changing the address of the request such that it will be processed by the thread server). The request may be sent, at 342, by moving the request (e.g., placing the request in a queue from which the thread server processes requests). If the request fails to be sent at 343, the thread transformer may reroute the request to a second thread server at 344. The request may fail to be sent, at 343, in cases where the thread server is not operational (e.g., a server outage, a network outage, etc.) The rerouting of the request, at 344, may operate in a similar manner to sending the request (e.g., changing the address of the request such that it will be processed by a second thread server). The rerouting of the request, at 344, may include the thread server initializing the second thread server before sending the request. The initialization of the second thread server may be spawning a new instance of the first thread server (e.g., similar assigned processor, same loaded libraries, etc.). The initialization of the second thread server may be spawning a new instance of a second thread server that is different than the first thread server (e.g., a second thread server with a different allocation of memory to the first thread server, second thread server with a different network address from the first thread server, etc.).

After the thread server processes a request and generates a response, the thread transformer may receive the response at 345. The response may be received, at 345, through the communication pathway (e.g., a message queue reserved for outbound responses from the thread server). The thread transformer may convert the response for the process server response for the worker processor at 346. The response conversion, at 346, may be similar to the request conversion of 341. The conversion may be a data conversion (e.g., changing variables between designated formats, recasting types, etc.).

The thread transformer may provide the received response to the thread-based client or worker process at 347. After providing the response, at 347, the thread transformer may again listen for requests at 330. If there is not a request, at 340, the thread transformer may monitor for a termination signal from the worker process or thread client at 350. If there is not a termination signal, at 360, the thread transformer may again listen for requests at 330. If there is a termination signal, at 360, then the thread transformer may end at 395.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of operating hybrid middleware to reduce thread-based server redundancy, the hybrid middleware including thread-based middleware and process-based middleware, the method comprising:
   verifying, by a thread transformer, whether thread-based middleware is running by querying a list of active thread servers running on one or more processors;
   when active thread server is not present, initializing by the thread transformer a thread server, either by forking a thread server process or transmitting a call to the operating system or prompting an administrator of the thread-based middleware to begin execution of the thread server;
   detecting, by the thread transformer, a first request from a first process-based middleware process, wherein the first process-based middleware process configured to create thread requests for a first thread-based middleware server, the first thread-based middleware server solely configured to accept and handle threads of the first process-based middleware process;
   intercepting, by the thread transformer, the first request of the first process-based middleware process for the first thread-based middleware server, from a communication pathway;
   converting, by the thread transformer, the first request of the first process-based middleware process for the first thread-based middleware server to a merged request, the merged request intended for a merged thread-based server of the thread-based middleware; and
   sending, by the thread transformer, the merged request to the merged thread-based server, the merged thread-based server configured to accept and handle threads from multiple process-based middleware processes.

2. The method of claim 1, wherein the method further comprises:
   detecting, by a second thread transformer, a second request from a second thread-based client to a second thread-based server, the second request derived by the second thread-based client in response to a second call from a second user program running on a second process-based middleware process to the second thread-based client;
   intercepting, by the second thread transformer, the second request from a second communication pathway, the second communication pathway facilitating multiprocessing by the second process-based middleware process;

converting, by the second thread transformer, the second request to a second merged request, the second merged request intended for the merged thread-based server of the thread-based middleware; and sending, by the second thread transformer, the second merged request to the merged thread-based server.

3. The method of claim 2, wherein the thread transformer and the second thread transformer are the same thread transformer.

4. The method of claim 2, wherein the first user program and the second user program are the same program.

5. The method of claim 1, wherein the method further comprises:

receiving, by the thread transformer, a merged response from the merged thread-based server, the merged response corresponding to the merged request; converting, by the thread transformer, the merged response into a first response; and sending, by the thread transformer, the first response to the first process-based middleware process.

6. The method of claim 1, wherein the thread transformer utilizes inter-process communication to intercept the first request.

7. The method of claim 1, wherein the first thread-based server does not exist.

8. The method of claim 1, wherein the method further comprises:

determining, by the thread transformer, that the merged thread-based server is unresponsive to the sent merged request;

sending, by the thread transformer, the merged request to a second merged thread-based server.

9. The method of claim 8, wherein the thread transformer initializes the second merged thread-based server before the sending the merged request to the second merged thread-based server.

10. A computer program product for operating hybrid middleware to reduce thread-based server redundancy, the hybrid middleware including thread-based middleware and process-based middleware, the computer program product comprising a computer readable storage medium having program instructions embodied therewith, the program instructions executable by a computer to perform a method comprising:

verifying, by a thread transformer, whether thread-based middleware is running by querying a list of active thread servers running on one or more processors;

when active thread server is not present, initializing by the thread transformer a thread server, either by forking a thread server process or transmitting a call to the operating system or prompting an administrator of the thread-based middleware to begin execution of the thread server;

detecting, by the thread transformer, a first request from a first process-based middleware process, wherein the first process-based middleware process configured to create thread requests for a first thread-based middleware server, the first thread-based middleware server solely configured to accept and handle threads of the first process-based middleware;

intercepting, by the thread transformer, the first request of the first process-based middleware process for the first thread-based middleware server, from a communication pathway;

converting, by the thread transformer, the first request of the first process-based middleware process for the first thread-based middleware server to a merged request, the merged request intended for a merged thread-based server of the thread-based middleware; and sending, by the thread transformer, the merged request to the merged thread-based server, the merged thread-based server configured to accept and handle threads from multiple process-based middleware processes.

11. The computer program product of claim 10, wherein the method further comprises:

detecting, by a second thread transformer, a second request from a second thread-based client to a second thread-based server, the second request derived by the second thread-based client in response to a second call from a second user program running on a second process-based middleware process to the second thread-based client;

intercepting, by the second thread transformer, the second request from a second communication pathway, the second communication pathway facilitating multiprocessing by the second process-based middleware process;

converting, by the second thread transformer, the second request to a second merged
request, the second merged request intended for the merged thread-based server of the thread-based middleware; and sending, by the second thread transformer, the second merged request to the merged thread-based server.

12. The computer program product of claim 11, wherein the thread transformer and the second thread transformer are the same thread transformer.

13. The computer program product of claim 11, wherein the first user program and the second user program are the same program.

14. The computer program product of claim 10, wherein the method further comprises:

receiving, by the thread transformer, a merged response from the merged thread-based server, the merged response corresponding to the merged request; converting, by the thread transformer, the merged response into a first response; and sending, by the thread transformer, the first response to the first process-based middleware process.

15. The computer program product of claim 10, wherein the thread transformer utilizes inter-process communication to intercept the first request.

16. A system for operating hybrid middleware to reduce thread-based server redundancy, the hybrid middleware including thread-based middleware and process-based middleware, the system comprising:

a memory; and a processor, the processor in communication with the memory, wherein the processor is configured to perform a method comprising:

verifying, by a thread transformer, whether thread-based middleware is running by querying a list of active thread servers running on one or more processors;

when active thread server is not present, initializing by the thread transformer a thread server, either by forking a thread server process or transmitting a call to the operating system or prompting an administrator of the thread-based middleware to begin execution of the thread server;

detecting, by the thread transformer, a first request from a first process-based middleware process, wherein the first process-based middleware process configured to create thread requests for a first thread-based middleware server, the first thread-based middleware server solely configured to accept and handle threads of the first process-based middleware;

intercepting, by the thread transformer, the first request of the first process-based middleware process for the first thread-based middleware server, from a communication pathway;

converting, by the thread transformer, the first request of the first process-based middleware process for the first thread-based middleware server to a merged request, the merged request intended for a merged thread-based server of the thread-based middleware; and sending, by the thread transformer, the merged request to the merged thread-based server, the merged thread-based server configured to accept and handle threads from multiple process-based middleware processes.

17. The system of claim 16, wherein the method further comprises:

detecting, by a second thread transformer, a second request from a second thread-based client to a second thread-based server, the second request derived by the second thread-based client in response to a second call from a second user program running on a second process-based middleware process to the second thread-based client;

intercepting, by the second thread transformer, the second request from a second communication pathway, the second communication pathway facilitating multiprocessing by the second process-based middleware process; converting, by the second thread transformer, the second request to a second merged request, the second merged request intended for the merged thread-based server of the thread-based middleware; and sending, by the second thread transformer, the second merged request to the merged thread-based server.

18. The system of claim 16, wherein the thread transformer utilizes inter-process communication to intercept the first request.

19. The system of claim 16, wherein the method further comprises:

determining, by the thread transformer, that the merged thread-based server is unresponsive to the sent merged request;

sending, by the thread transformer, the merged request to a second merged thread-based server.

20. The system of claim 16, wherein the thread transformer initializes the second merged thread-based server before the sending the merged request to the second merged thread-based server.

* * * * *